US009220998B2

(12) United States Patent
Seo et al.

(10) Patent No.: US 9,220,998 B2
(45) Date of Patent: Dec. 29, 2015

(54) FILTER MEDIA FOR A LIQUID FILTER USING AN ELECTROSPUN NANOFIBER WEB, METHOD FOR MANUFACTURING SAME, AND LIQUID FILTER USING SAME

(71) Applicant: AMOGREENTECH CO., LTD., Gimpo-si (KR)

(72) Inventors: In Yong Seo, Seoul (KR); Seung Hoon Lee, Goyang-si (KR); Yong Sik Jung, Namyangju-si (KR)

(73) Assignee: AMOGREENTECH CO., LTD. (KR)

( * ) Notice: Subject to any disclaimer, the term of this patent is extended or adjusted under 35 U.S.C. 154(b) by 413 days.

(21) Appl. No.: 13/729,247

(22) Filed: Dec. 28, 2012

(65) Prior Publication Data

US 2013/0118973 A1    May 16, 2013

Related U.S. Application Data (63) Continuation of application No. PCT/KR2011/004810, filed on Jun. 30, 2011.

(30) Foreign Application Priority Data

Jun. 30, 2010 (KR) .......... 10-2010-0062959
Jun. 30, 2011 (KR) .......... 10-2011-0064683

(51) Int. Cl.
*B01D 69/06* (2006.01)
*B01D 29/00* (2006.01)
(Continued)

(52) U.S. Cl.
CPC ........ *B01D 29/0093* (2013.01); *B01D 39/1623* (2013.01); *B01D 67/0013* (2013.01);
(Continued)

(58) Field of Classification Search
CPC ...... B01D 39/00; B01D 39/08; B01D 39/083; B01D 39/14; B01D 39/16; B01D 39/1607; B01D 39/1623; B01D 39/1615; B01D 39/1692; B01D 39/18; B01D 69/00; B01D 69/02; B01D 69/06; B01D 69/10; B01D 69/12; B01D 69/122; B01D 71/00; B01D 71/06; B01D 71/08; B01D 71/10; B01D 71/12; B01D 71/24; B01D 71/26; B01D 71/28; B01D 71/30; B01D 71/38; B01D 71/40; B01D 71/44; B01D 71/46; B01D 71/48; B01D 71/50; B01D 71/52; B01D 71/54; B01D 71/56; B01D 71/58; B01D 71/66; B01D 71/70; B01D 71/72; B01D 71/74; B01D 71/76; B01D 2323/08; B01D 2323/10; B01D 2323/26; B01D 2323/39; B01D 2323/42; B01D 2323/50
USPC ............... 210/348, 483, 499, 500.1, 500.21, 210/500.27, 503, 504, 505, 506, 507, 508
See application file for complete search history.

(56) References Cited

U.S. PATENT DOCUMENTS

2008/0070463 A1 * 3/2008 Arora et al. ............... 442/327
2008/0217807 A1   9/2008 Lee et al.
2008/0233284 A1 * 9/2008 Kim et al. ............... 427/248.1

FOREIGN PATENT DOCUMENTS

KR    1020050037906    4/2005
KR    1020080060263    7/2008
(Continued)

*Primary Examiner* — Allison Fitzsimmons
(74) *Attorney, Agent, or Firm* — Cantor Colburn LLP (57) ABSTRACT

Provided is a filter medium for a liquid filter, having a three-dimensional micropore structure of a multi-layered structure using a multilayer nanofiber web that is obtained by performing air-electrospinning, to thus be thin but have high efficiency and long life, a method of manufacturing the filter medium using the multilayer nanofiber web, and a liquid filter using the filter medium. The filter medium for a liquid filter, includes: a nanofiber web that is made by stacking nanofibers that are obtained by air-electrospinning a fibrous polymer material and that have micropores; and a supporter that is inserted and combined onto one surface or in an inner portion of the nanofiber web.

4 Claims, 4 Drawing Sheets

(51) Int. Cl.
  *B01D 39/16* (2006.01)
  *B01D 67/00* (2006.01)
  *B01D 71/46* (2006.01)
  *B01D 39/00* (2006.01)
  *B82Y 40/00* (2011.01)

(52) U.S. Cl.
  CPC .......... *B01D 71/46* (2013.01); *B01D 2239/025* (2013.01); *B01D 2239/065* (2013.01); *B01D 2239/0631* (2013.01); *B01D 2239/0654* (2013.01); *B01D 2239/10* (2013.01); *B01D 2323/39* (2013.01); *B01D 2323/42* (2013.01); *B82Y 40/00* (2013.01); *Y10S 977/778* (2013.01); *Y10S 977/89* (2013.01); *Y10S 977/902* (2013.01)

(56) References Cited

FOREIGN PATENT DOCUMENTS

KR 1020080086066 9/2008
KR 1020100035208 4/2010

* cited by examiner

FIG. 4

FILTER MEDIA FOR A LIQUID FILTER USING AN ELECTROSPUN NANOFIBER WEB, METHOD FOR MANUFACTURING SAME, AND LIQUID FILTER USING SAME

TECHNICAL FIELD

The present invention relates to a filter medium for a liquid filter, using a multi-layered structure of a nanofiber web having air-electro spun (AES) three-dimensional micropores as membranes, to thus exert good durability and utilize a hydrophobic resin as well as a hydrophilic resin due to capillarity, a method of manufacturing the filter medium, and a liquid filter using the filter medium.

BACKGROUND ART

As a technology of manufacturing membranes and a membrane application technology have been recently dramatically developed, a membrane technology is widely used in liquid processing fields such as removal of contaminants from liquid, or separation, enrichment and recovery of useful materials from liquid.

Existing membrane technologies are being replaced by membrane technologies because of constant performance and stability according to membrane pore sizes, and due to convenience and concise system according to automation.

There are porous membranes and calendered nonwovens (that is nonwoven fabrics) as membranes used in existing liquid filters.

Porous membranes are produced in a manner that membranes are formed by using polymer materials, for example, PTFE-based nylon, polysulfone, etc., and then pores are formed in the membranes by using chemical and physical methods. Here, since a pore structure is a closed pore structure of the two-dimensional geometry, filter efficiency is low.

In addition, since a pore structure is a closed pore structure of the two-dimensional geometry in the case of using a hydrophobic polymer such as PTFE (polytetrafluoroethylene) in a conventional filter, liquid does not pass through the conventional filter easily. Accordingly, the conventional filter needs to be pressurized. As a result, problems such as high energy costs, frequent filter replacement, and a low flow rate of water are pointed out.

Moreover, since a medium is about 100 μm thick, such a porous membrane is thick and weighs much depending on a material. Thus, there is a problem that it is difficult of bending a porous membrane medium and putting a lot of threads per inch in a filter.

Meanwhile, calendered nonwovens form fibers from polymeric materials, for example, polypropylene, through a meltblown spinning method, but the size of the fibers is in micro units. Accordingly, unless the fibers have micropores, they are not uniformly distributed and pores are uneven. Also, since contaminants exit concentratively through large pores, filter efficiency is low.

In addition, calendered nonwovens has an average pore size of about 5 μm to about 20 μm, and an excessive calendaring should be performed in order to reduce the average pore size of the filter into about 3 μm or less. However, excessive calendering clogs pores and thus porosity becomes small. Accordingly, if calendered nonwovens are used in liquid filters, a filter pressure becomes high and pores are quickly clogged, to thus cause a negative effect upon a filter life.

Thus, even if a liquid processing module is manufactured by using the existing membrane technology, a fluid flow is lowered due to a membrane clogging phenomenon and a driving pressure rises.

The membrane clogging phenomenon is severe especially in the high concentration fluid, and it was impossible to apply the membrane technology for the high concentration and high turbidity fluid. Also, pores become open to thus cause durability to be lowered.

Therefore, long life and high efficient membranes having consistent filtering performance and reliability according to the pore size with a thin layer of a fine pore structure should be developed urgently so as to be used for liquid processing.

On the other hand, the Korean Laid-Open Patent Publication No. 2008-60263 proposed a filter medium including one or more nanofiber layers of polymer nanofibers having an average fiber diameter of approximately 1 μm or less, in which a mean flow pore size is in the range of about 0.5 μm to about 5.0 μm and solidity is in the range of about 15% to about 90% by volume, and a water flow rate through the medium is greater than about 0.055 L/min/cm$^2$ at a differential pressure of about 10 psi (about 69 kPa).

The method of manufacturing a filter medium proposed in the Korean Laid-Open Patent Publication No. 2008-60263, includes a spinning beam unit having one or more spinning beams each having a spinning nozzle, a blowing gas injection nozzle, and a collector, and is characterized in that a polymer solution is compressed and discharged from the spinning nozzle by using a fine fiber spinning apparatus in which a high voltage electric field is maintained between the spinning beam and the collector, and simultaneously the compressed and discharged polymer solution is blown together with a blowing gas discharged from the blowing gas injection nozzle, to thus form a fiber web of nanofibers and collect the formed fiber web in a single passage moving collection device below a single spinning beam.

Also, a formic acid solution containing nylon of about 24 wt % is used as the polymer solution in the Korean Laid-Open Patent Publication No. 2008-60263, to thus spin nanofibers by using an electro-blown spinning method or an electroblowing method, and to thereby form a web.

However, the method of forming a fiber web of nanofibers in the Korean Laid-Open Patent Publication No. 2008-60263 cannot be called a manufacturing technology of using a multi-hole spin pack. In addition, in the case of producing a nanofiber web by an air-electrospinning (AES) method in an air spraying air-electrospinning apparatus using a multi-hole spin pack having a large number of spinning nozzles arrayed in a large number of rows and columns in order to increase productivity, in which air spinning takes place in each nozzle, a spinning solution containing a polymer of about 24 wt % increases viscosity. As a result, since solidification takes place at the surface of the solution, it is difficult to perform spinning for a long time. Also, since fibers increase in diameter, a fiber web of micrometers or less cannot be formed.

Furthermore, in the case that the ultrafine fiber web obtained by electrospinning does not go through a pretreatment process of appropriately adjusting the amount of the solvent and moisture remaining on the surface of the web before performing calendering, pores are increased but the strength of the web is weakened. Otherwise, in the case that evaporation of the solvent is not performed too slowly, a phenomenon of melting the web may occur.

SUMMARY OF THE INVENTION

To solve the above problems or defects, it is an object of the present invention to provide a filter medium for a liquid filter, using a nanofiber web having air-electrospun (AES) three-dimensional micropores as membranes, to thus exert good durability and utilize a hydrophobic resin as well as a hydrophilic resin due to capillarity, and a method of manufacturing the filter medium.

It is another object of the present invention to provide a filter medium for a liquid filter, in which membranes of a multi-layered structure are stacked, to thus perform depth filtration as well as surface filtration and to thereby maximize filter efficiency, a method of manufacturing the filter medium, and a liquid filter using the filter medium.

It is still another object of the present invention to provide a filter medium for a liquid filter, having fine pores in size by performing a high-temperature and high-pressure calendering process, so as to be thin and light but to prevent degradation of filter efficiency due to a multi-layered structure, and a method of manufacturing the filter medium.

It is yet another object of the present invention to provide a filter medium for a liquid filter, using a nanofiber web having a three-dimensional network structure as membranes, to thus have a large specific surface area, a small average pore size, and a large maximum pore size, and a method of manufacturing the filter medium.

It is still yet another object of the present invention to provide a filter medium for a liquid filter, using a nanofiber web having a three-dimensional network structure as membranes, to thus capture a large amount of impurity particles, and have a high impurity removal rate, and to exhibit an excellent filtration characteristic, and a liquid filter using the filter medium.

It is a further object of the present invention to provide a filter medium for a liquid filter, using a nanofiber web having a three-dimensional network structure as membranes, to have a high porosity and a high flow rate of water, and a liquid filter using the filter medium.

To accomplish the above and other objects of the present invention, according to an aspect of the present invention, there is provided a filter medium for a liquid filter, comprising:

a nanofiber web that is made by stacking nanofibers that are obtained by air-electrospinning a fibrous polymer material and that have micropores; and a supporter that is inserted and combined onto one surface or in an inner portion of the nanofiber web.

Preferably but not necessarily, the nanofiber web is formed by stacking a number of nanofiber webs in a multi-layered structure, in which the nanofiber web of each layer has a different structure, depending on a degree of volatilization of a solvent by heat compression, to thus perform surface filtration or depth filtration.

Preferably but not necessarily, the supporter is a nonwoven fabric or imitation vellum paper.

Preferably but not necessarily, the polymer material of about 5 wt % to about 22.5 wt % is mixed in a spinning solution for air-electrospinning.

Preferably but not necessarily, a solvent that is used in the spinning solution is a 2-component solvent that is obtained by mixing a solvent with a relatively high boiling point (BP) and a solvent with a relatively low boiling point (BP).

According to another aspect of the present invention, there is provided a method of manufacturing a filter medium for a liquid filter, comprising the steps of:

dissolving a fibrous polymer material in a solvent, to thus manufacture a spinning solution;

air-electrospinning the spinning solution, to thus form a nanofiber web;

heat compressing the nanofiber web; and combining a supporter onto one surface of the heat compressed nanofiber web.

According to still another aspect of the present invention, there is provided a method of manufacturing a filter medium for a liquid filter, comprising the steps of:

dissolving a fibrous polymer material in a solvent, to thus manufacture a spinning solution;

air-electrospinning the spinning solution to an upper portion of the supporter, to thus form a nanofiber web; and heat compressing a supporter on one surface of which the nanofiber web is formed.

Preferably but not necessarily, the spinning solution comprises the polymer material of about 5 wt % to about 22.5 wt %.

Preferably but not necessarily, the air-electrospinning is accomplished by using a multi-hole spin pack in which a number of spinning nozzles are aligned in a number of rows and a number of columns Preferably but not necessarily, wherein the nanofiber web is of a multi-layered structure.

Preferably but not necessarily, the supporter is any one of a spun bond nonwoven fabric, a thermal bond nonwoven fabric, a melt-blown nonwoven fabric, and a wet laid nonwoven fabric.

Preferably but not necessarily, the method of manufacturing a filter medium for a liquid filter, further comprises the step of stacking a second nanofiber web on the other surface of the supporter in which the nanofiber web is not formed.

According to yet another aspect of the present invention, there is provided a liquid filter comprising:

a filter medium module that is obtained by bending the filter medium; and a casing surrounding the filter medium module.

As described above, the present invention provides a filter medium for a liquid filter, using a nanofiber web having air-electrospun (AES) three-dimensional micropores as membranes, to thus exert good durability and utilize a hydrophobic resin as well as a hydrophilic resin due to capillarity, and a method of manufacturing the filter medium.

In addition, the present invention provides a filter medium for a liquid filter, in which membranes of a multi-layered structure are stacked, to thus perform depth filtration as well as surface filtration and to thereby maximize filter efficiency, a method of manufacturing the filter medium, and a liquid filter using the filter medium.

Further, the present invention provides a filter medium for a liquid filter, having fine pores in size by performing a high-temperature and high-pressure calendering process, so as to be thin and light but to prevent degradation of filter efficiency due to a multi-layered structure, and a method of manufacturing the filter medium.

In addition, the present invention provides a filter medium for a liquid filter, using a nanofiber web having a three-dimensional network structure as membranes, to thus have a large specific surface area, a small average pore size, and a large maximum pore size, and a method of manufacturing the filter medium.

Further, the present invention provides a filter medium for a liquid filter, using a nanofiber web having a three-dimensional network structure as membranes, to thus capture a large amount of impurity particles, and have a high impurity removal rate, and to exhibit an excellent filtration characteristic, and a liquid filter using the filter medium.

In addition, the present invention provides a filter medium for a liquid filter, using a nanofiber web having a three-dimensional network structure as membranes, to have a high porosity and a high flow rate of water, and a liquid filter using the filter medium.

DETAILED DESCRIPTION OF THE INVENTION

Hereinafter, a filter medium for a liquid filter, a method of manufacturing the filter medium, and a liquid filter using the filter medium according to a preferred embodiment of the present invention will be described in detail with reference to the accompanying drawings.

The present invention provides a liquid filter that is used for processing liquid. The liquid filter is manufactured by a process of mixing a polymer material and a solvent to produce a spinning solution; a process of performing air-electrospinning by using a multi-hole spin pack arrayed in a number of rows and a number of columns to thus form a nanofiber web; and then a process of combining the nanofiber web with a nonwoven fabric, an imitation vellum paper, etc., as a supporter.

Here, the supporter that can be used in the present invention is any one of, for example, a melt-blown nonwoven fabric, a spun bond nonwoven fabric, a thermal bond nonwoven fabric, a chemical bond nonwoven fabric, and a wet laid nonwoven fabric. The nonwoven fabric may be a fiber having a diameter of about 40 μm to about 50 μm, and pores of about 100 μm or larger.

The polymer material used in the present invention may be a polymer material that can be electrospun and may be a hydrophilic polymer or a hydrophobic polymer, for example. One polymer material or a mixture of two or more polymer materials may be used in the present invention.

The polymer material used in the present invention may be a resin that may be dissolved in an organic solvent for electrospinning, and that may be capable of forming nanofibers by electrospinning, but are not specifically limited thereto. For example, the polymer materials used in the present invention may be:

polyvinylidene fluoride (PVdF), poly(vinylidene fluoride-co-hexafluoropropylene), a perfluoropolymer, polyvinyl chloride, polyvinylidene chloride, or a copolymer thereof;

a polyethylene glycol derivative containing polyethylene glycol dialkylether and polyethylene glycol dialkylester;

poly(oxymethylene-oligo-oxyethylene);

polyoxide containing polyethylene oxide and polypropylene oxide;

polyvinyl acetate, poly(vinyl pyrrolidone-vinyl acetate), polystyrene, and a polystyrene acrylonitrile copolymer;

a polyacrylonitrile copolymer containing polyacrylonitrile (PAN) and a polyacrylonitrile methyl methacrylate copolymer; or polymethyl methacrylate, a poly methyl methacrylate copolymer, or a mixture thereof Also, the polymer material used in the present invention may be:

aromatic polyester such as polyamide, polyimide, polyamideimide, poly(meta-phenylene isophthal amide), polyester sulfone (PES), polyether ketone, polyetherimide (PEI), polyethylene terephthalate, polytrimethylene terephthalate, or polyethylene naphthalate;

polyphosphazene such as polytetrafluoroethylene, polydifenoxiphosphazene, poly{bis[2-(2-methoxyethoxy)phosphazene]};

polyurethane, and polyurethane copolymer containing polyether urethane; or cellulose acetate, cellulose acetate butyrate, cellulose acetate propionate.

The polymer materials that may be particularly desirably used as the filter material of the present invention may be polyacrylonitrile (PAN), polyvinylidene fluoride (PVdF), polyester sulfone (PES), and polystyrene (PS), alone or a mixture of polyvinylidene fluoride (PVdF) and polyacrylonitrile (PAN), a mixture of PVdF and PES, or a mixture of PVdF and thermoplastic polyurethane (TPU).

Therefore, the polymer material used in the present invention is not specifically limited to a thermoplastic polymer or a thermosetting polymer that may be air-electrospun.

It is desirable that the polymer material of about 5 wt % to about 22.5 wt % is mixed at the time of manufacturing a spinning solution.

Here, in the case that content of the polymer material is less than about 5 wt %, it is difficult to produce fibrous formation, spinning is not made but spraying is made, to thus form particles not fibers. Otherwise, even if spinning is made, a lot of beads are formed and a solvent is not well evaporated. As a result, a filter medium will melt during performing a web calendaring process, to thus cause a pore clogging phenomenon to occur. In addition, in the case that content of the polymer material exceeds about 22.5 wt %, viscosity rises up and thus solidification occurs at the surface of the solution, to thereby make it difficult to perform spinning for a long time, and to thereby increase diameter of the fiber to thus make it impossible to make fibrous formation of a micrometer or less in size.

In order to prepare a spinning solution, it is possible to use a single-component solvent, for example, dimethylformamide (DMF), as a solvent mixed with a polymer material. However, in the case that a 2-component solvent is used as a solvent that is used in the spinning solution, it is desirable to use a 2-component solvent that is obtained by mixing a solvent with a relatively high boiling point (BP) and a solvent with a relatively low boiling point (BP).

In the case of a 2-component solvent according to the present invention, it is preferable that a high boiling point solvent and a low boiling solvent are mixed at a weight ratio of about 7:3 to about 9:1. In the case that the high boiling point solvent is mixed at a weight ratio of less than 7, the polymer material does not dissolve completely. In the case that the high boiling point solvent is mixed at a weight ratio of more than 9, the low boiling point solvent is mixed too low at a weight ratio. As a result, evaporation of the solvent is not made well from the spun fiber, to thus cause formation of the web not to occur smoothly.

In the case that only a high boiling point solvent is used as a solvent, spinning is not made but spraying is made, to thus form particles not fibers. Otherwise, even if spinning is made, a lot of beads are formed and a solvent is not well evaporated.

As a result, a filter medium will melt during performing a web lamination process, to thus cause a pore clogging phenomenon to occur.

In addition, in the case that only a low boiling point solvent is used as a solvent, evaporation of the solvent happens very quickly and thus many small fibers are produced in a needle of a spinning nozzle, to thereby act as a cause of a spinning trouble.

In the case that the polymeric materials are PES and PVdF, respectively in the present invention, a solvent that is obtained by mixing, for example, DMAc (N, N-Dimethylacetoamide: BP-165° C.) as a high boiling solvent, and acetone (BP-56° C.) at a weight ratio of about 9:1, may be used as the 2-component solvent. In addition, in the case that the polymeric materials are PEI and PVdF, respectively, NMP (N-methylpyrrolidone: BP-202 to 204° C.) and THF (Terahydrofuran: BP-67° C.) may be mixed at a weight ratio of about 9:1 and used as the 2-component solvent.

In this case, a ratio of a mixture of the 2-component solvent and the whole polymer material is preferably set at a weight ratio of about 8:2.

A spinning solution that is obtained by dissolving the single polymer material or the mixed polymer materials in the solvent is air-electrospun by using a multi-hole spin pack, to then obtain a nanofiber web that is formed into a multi-layered structure. Then, if a heat compression process, for example, a calendaring process is performed, a filter for processing liquid may be manufactured.

Here, a pore size of a nanofiber web may become about 0.8 µm or less by performing calendaring at about 70° C. to about 190° C. under a high-temperature and high-pressure condition.

A process of forming a nanofiber web through air-electrospinning to manufacture a liquid filter according to the present invention will be described below with reference to FIG. 1.

Figure 1:
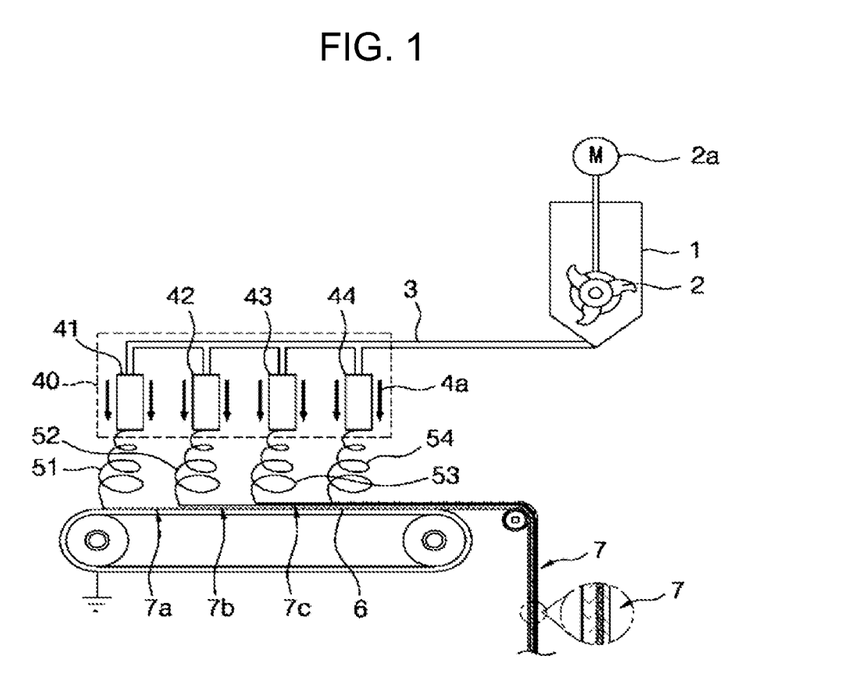
FIG. 1 is a schematic diagram for explaining air-electrospinning applied to the present invention.

Referring to FIG. 1, an air spraying electrospinning apparatus that is applied in the present invention includes a spinning solution tank 1 containing a spinning solution that is obtained by mixing a polymer material with a solvent, and a multi-hole spin pack 40 in which a number of spinning nozzles 41 to 44 that are connected to a high-voltage generator (not shown) are aligned in a number of columns and a number of rows.

The spin pack 40 is disposed at the upper portion of a grounded collector 6 that is formed in the form of a conveyor moving at a constant speed, in which the spinning nozzles 41 to 44 are aligned at intervals along an advancing direction of the collector 6. Also, the spinning nozzles 41 to 44 are aligned at intervals along a direction orthogonal to the advancing direction of the collector 6 (that is, along the width direction of the collector 6).

In FIG. 1, for the convenience of description, four spinning nozzles are aligned at intervals along the advancing direction of the collector 6.

The number of the spinning nozzles that are aligned along the advancing direction of the collector 6 are, for example, about 30 to about 60, or more as needed. In the case that a number of the spinning nozzles are used as described above, productivity gains can be achieved by increasing the speed of rotation of the collector 6.

The spinning solution tank 1 may include an agitator 2 that uses a mixing motor 2a as a driving source, and is connected to the spinning nozzles 41 to 44 arrayed in the respective columns, through a quantitative pump (not shown) and a transfer tube 3.

The polymer spinning solution that is sequentially discharged from the spinning nozzles 41 to 44 arrayed in the four columns passes through the spinning nozzles 41 to 44 that are electrically charged by the high voltage generator (not shown) to then be released as ultrafine fibers 51 to 54, respectively. Thus, the ultrafine fibers 51 to 54 are sequentially accumulated on the grounded collector 6 that is formed in the form of a conveyor moving at a constant speed, to thereby form a multi-layered nanofiber web 7.

In the case that a plurality of multi-hole spin packs 40 are used for mass production, a mutual interference phenomenon occurs. Accordingly, fibers may be blown around to prevent the fiber from being captured. As a result, the obtained nanofiber web becomes too bulky, to thereby act as a cause of the spinning trouble.

Taking this into consideration, the present invention uses the multi-hole spin pack 40 but forms a multi-layered nanofiber web 7 by an air-electrospinning method in which spraying of air 4a is accomplished from a number of air injection nozzles (not shown) for each of the spinning nozzles 41 to 44 arrayed in the respective columns Accordingly, the air spraying electrospinning device according to the present invention may perform air spraying at the spin pack nozzles of the multi-hole spin pack 40 at the same time when the spinning solution is spun for each of the spinning nozzles arrayed in the respective columns.

In other words, when electrospinning is made by air-electrospinning in the present invention, air spraying is performed from the outer periphery of each of the spinning nozzles, to thus play a dominant role of making air trapping and integrating fast volatile polymer fibers, and to thereby produce liquid filters having higher stiffness and minimize a spinning trouble that may be caused by flying of the fibers.

The spin pack nozzles of the multi-hole spin pack 40 used in the present invention is made to set air pressure of air spraying to be in the range of about 0.1 to about 0.6 MPa, for example, in the case of about 245 mm/61 holes. In this case, air pressure that is less then about 0.1 MPa, does not contribute to capture and integrate the flying fibers. In the case that air pressure exceeds about 0.6 MPa, the cone of each spinning nozzle is hardened to thus cause a clogging phenomenon of the needle to occur and to thereby cause a spinning trouble to occur.

Meanwhile, when spinning is performed by an air-electrospinning (AES) method by using the multi-hole spin pack 40, after the spinning solution has been prepared as described above, temperature and humidity inside a spinning chamber makes a big influence upon volatilization of the solvent from the spun fibers. Accordingly, proper conditions such as the spinning temperature and humidity determines whether or not fibers may be formed, and also determines diameter of the fiber and also determines whether or not beads may be formed.

When the spinning solution is sequentially and continuously spun through the spinning nozzles 41 to 44 arrayed in the four columns, temperature and humidity inside the spinning chamber should be set constant. If conditions such as temperature and humidity inside the spinning chamber differ from the proper conditions, any one of the spinning nozzle 41 of the first column and the spinning nozzle 42 of the second column may not be spun, or a web that is generated according to a subsequent process may not be adhered to and separated from webs of the entire process.

When the spinning solution is spun, PAN of about 10 wt % is dissolved in a solvent DMAc, and viscosity of the solution is set to about 230 to about 240 cp, in the case that a single polymer material, for example, PAN is used, and the solution is discharged at a pressure of about 0.025 MPa to about 0.03 MPa. Here, voltage applied to the nozzles of the spin pack 40 is set to about 90 kV to about 105 kV, and air pressure is set to about 0.4 MPa to about 0.6 MPa.

In addition, temperature of the air-electrospinning chamber is set to about 34° C., and humidity thereof is set to about 38% to about 40%.

Meanwhile, the spinning solution of PVdF alone or a mixture of PVdF and PES may be spun. In this case, a first nanofiber web 7a consists of a fiber 51 that is obtained by making the spinning solution spun from a first spinning nozzle 41. Then, a second nanofiber web 7b consists of a fiber 52 that is obtained by making the spinning solution spun on an upper portion of the first nanofiber web 7a from a second spinning nozzle 42. Then, a third nanofiber web 7c consists of a fiber 53 that is obtained by making the spinning solution spun on an upper portion of the second nanofiber web 7b from a third spinning nozzle 43. Finally, a fourth nanofiber web 7d consists of a fiber 54 that is obtained by making the spinning solution spun on an upper portion of the third nanofiber web 7c from a fourth spinning nozzle 44. Accordingly, a nanofiber web 7 of a multi-layered structure having four layers may be finally obtained.

The first to third nanofiber webs 7a to 7d are formed by laminating ultrafine fibers of about 0.5 μm to about 1.5 μm spun from the spinning nozzles 41 to 44 arrayed in the four columns. In other words, the fiber spun from the fourth spinning nozzle 44 is finally laminated on the upper portion of the third nanofiber web 7c that is laminated by the fiber spun from the third spinning nozzle 43, to thus form the four-layered nanofiber web 7 that consists of the ultrafine fibers that are fused in a three-dimensional network structure, in which the respective webs 7a to 7d are ultra-thin and ultra-light, and have a large specific surface area and a high porosity.

The air spraying air-electrospinning apparatus illustrated in FIG. 1 has shown that the four-layered nanofiber web 7 is formed by the four spinning nozzles 41 to 44, but the present invention may use a multi-hole spin pack 40 having a number of spinning nozzles that are arrayed in a number of rows and a number of columns, and that are made to perform high-speed spinning and high-speed rotation, to thus obtain a multi-layered nanofiber web formed of an ultra-thin film for each layer.

By doing so, the multi-layered nanofiber web 7 is formed by the air-electrospinning. A heating compression roller (not shown) is used in a calendering process of thermally compressing the multi-layered nanofiber web. In this case, when a lamination temperature is too low, webs are too bulky to have stiffness. Otherwise, when a lamination temperature is too high, webs are melted to thus cause pores to be clogged.

In addition, the nanofiber web should be thermally compressed at a temperature at which the solvent remaining in the web that forms the external surface layer can be completely volatilized. In the case of the multi-layered nanofiber web, structural differences between the respective webs exist due to differences in the extent that the solvent evaporates for each layer. Accordingly, since a difference in a filtration degree takes place, surface filtration is performed in the surface layers of both sides of the nanofiber web, and depth filtration is performed in the inner layers thereof For this purpose, the heating compression roller (not shown) is set at a temperature of about 70° C. to about 190° C. and in a speed of about 50 rpm to about 200 rpm, in the present invention, to then execute a calendering process of the multi-layered nanofiber web 7, and to thus maintain stabilization of liquid filters.

Hereinafter, a process of manufacturing a filter medium for a liquid filter according to the present invention will be described in further detail with reference to FIGS. 2 and 3.

Figure 2:
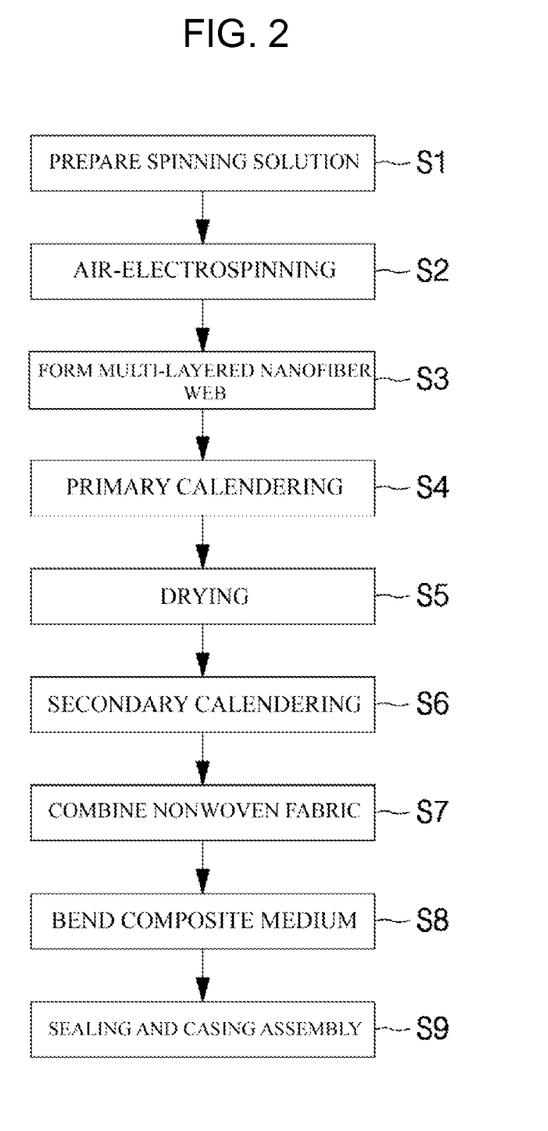
FIG. 2 is a flowchart view for explaining a process of manufacturing a filter medium for a liquid filter using a nanofiber web in accordance with an embodiment of the present invention.

FIG. 2 is a flowchart view for explaining a process of manufacturing a filter medium for a liquid filter in accordance with an embodiment of the present invention.

Referring to FIG. 2, a polymer material that has been described above is dissolved in a solvent, to thus manufacture a spinning solution (S1). The spinning solution is put into the spinning solution tank 1 of FIG. 1, thereby air-electrospinning the spinning solution (S2). Then, a multi-layered nanofiber web 7 is formed (S3). The thus-formed multi-layered nanofiber web 7 is made to undergo a primary calendering process (S4), to then be dried (S5). The primary calendering process is performed to remove the solvent and water and compress the web. After the drying is completed, a secondary calendering process is performed in order to implement the smaller pores and increase the strength (S6). Once the secondary calendering process is completed, a nonwoven fabric is combined with the multi-layered nanofiber web 7 (S7).

Here, the nonwoven fabric is inserted onto and combined with the upper and lower portions of the multi-layered nanofiber web 7, respectively. Otherwise, the nonwoven fabric is inserted onto and combined with the upper or lower portion of the multi-layered nanofiber web 7. The nonwoven fabric may be used as a supporter. The nonwoven fabric is combined with the multi-layered nanofiber web 7, to thus multiplex the multi-layered nanofiber web 7 (also, referred to as a filter medium 7 in FIG. 4), and to thereby completely manufacture a filter medium 7 for a liquid filter (S7).

In the case of the above-described filter medium manufacturing process, it is desirable to include the drying process (S5) and the secondary calendering process (S6). In the case that the drying process (S5) and the secondary calendering process (S6) are not included in the present invention, a processing time may be increased.

In the case that a supporter is combined with only one surface of the nanofiber web, the present invention may further include a process of laminating a nanofiber web onto the other surface of the supporter where the nanofiber web has been formed.

Thereafter, a bending process is carried out to increase the specific surface area of the web using the filter medium 7 (S8). In this case, first and second nonwoven fabrics 8 and 9 are respectively added onto both surfaces of the filter medium 7 to act as a protective layer while maintaining the bent state, to thus form a composite filter medium 10 to then be bent. For example, polypropylene PP spun bond nonwovens may be used as the first and second nonwoven fabrics 8 and 9.

Then, the bent composite filter medium 10 undergoes a modularizing process by calculating an area, the number of threads per inch, etc., for example, as shown in Table 1.

TABLE 1

| Number of threads per inch (ea) | Height of thread (mm) | Temperature of heat plate (° C.) | Filtration area (m²) |
| --- | --- | --- | --- |
| 95 | 13 mm | 120 | 0.54 |

Figure 4:
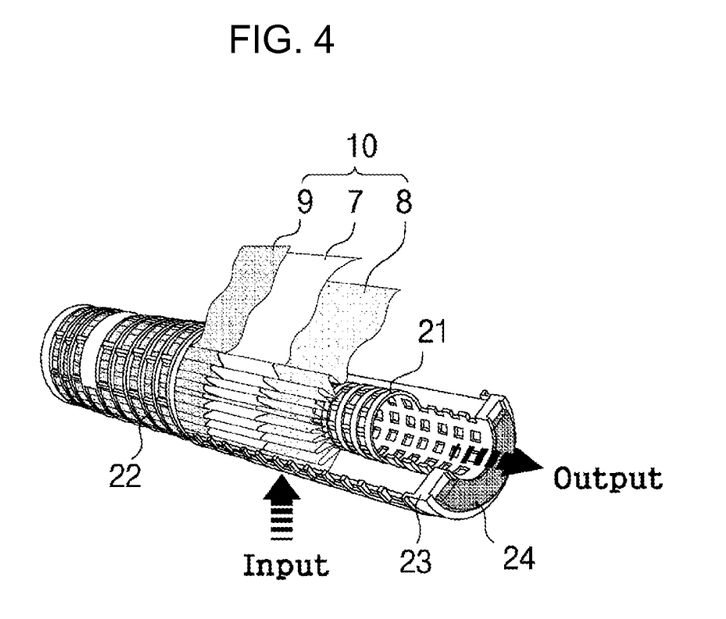
FIG. 4 is a perspective view illustrating a partly incised liquid filter using a filter medium according to the present invention.

A sealing and casing assembly process is performed by thermal-bonding at both side ends of the filter medium module having undergone the modularizing process, as shown in FIG. 4 (S9). In other words, a modularized filter medium module is encased by a cylindrical cage 22 made of PP covered on the outer circumference of a cylindrical inner core 21 made of PP forming a frame of a cartridge.

The inner core 21 and the cage 22 are made of a synthetic resin such as PP and formed in a mesh net structure, to thus maintain the overall shape of the cartridge when various types of liquids pass through the filter medium.

After that, an end cap 23 is assembled at both ends of the inner core 21 and the cage 22, respectively, and a gasket 24 is assembled on both sides of the end cap 23, respectively, so that an inflow through both sides of the modularized filter medium module is discharged through a hollow portion of the inner core 21.

In the case of the unit cartridge filter for processing liquid that is assembled as described above, the liquid to be filtered is input through the side of the cartridge and output through the hollow portion of the inner core 21. As necessary, a number of unit cartridge filters are assembled in a single case, to thus constitute a large-scale cartridge filter.

Figure 3:
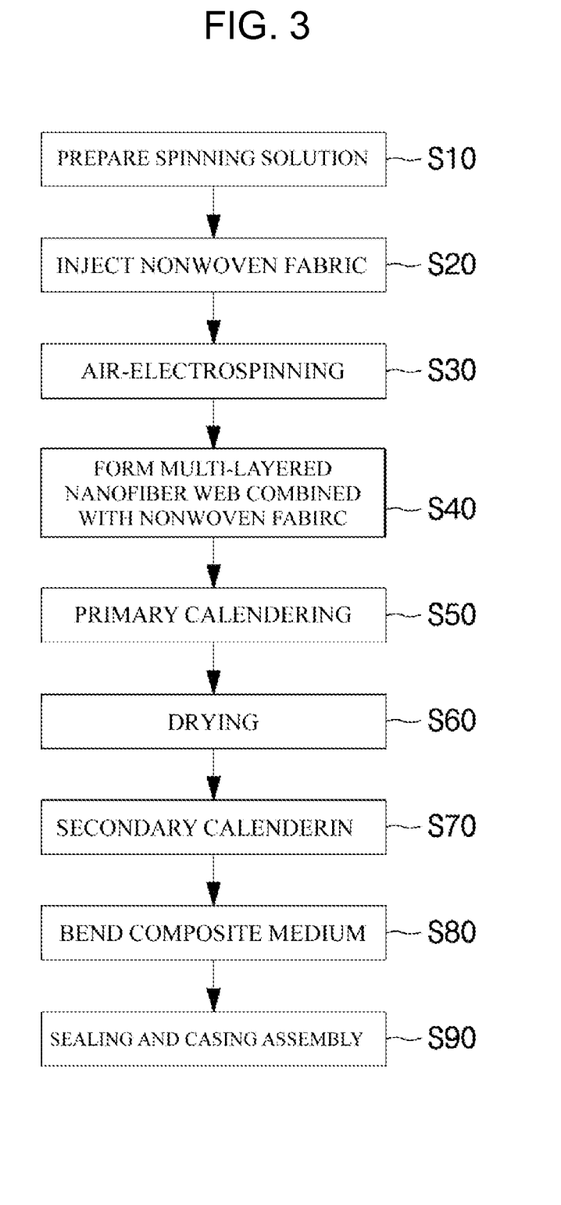
FIG. 3 is a flowchart view for explaining a process of manufacturing a filter medium for a liquid filter using a nanofiber web in accordance with another embodiment of the present invention.

FIG. 3 is a flowchart view for explaining a process of manufacturing a filter medium for a liquid filter, in accordance with another embodiment of the present invention.

Referring to FIG. 3, a polymer material that has been described above is dissolved in a solvent, to thus manufacture a spinning solution (S10). After manufacturing the spinning solution, a nonwoven fabric is injected onto the upper portion of the collector 6 before air-electrospinning the spinning solution (S20). Then, after the nonwoven fabric has been injected onto the upper portion of the collector 6, the spinning solution is air-electrospun onto the upper portion of the nonwoven fabric (S30). As the spinning solution is air-electrospun, a multi-layered nanofiber web is formed on the upper portion of the nonwoven fabric at a state where the nonwoven fabric is combined with the nanofiber web (S40). The thus-formed multi-layered nanofiber web is made to undergo a primary calendering process (S50), to then be dried (S60). After the drying is completed, a secondary calendering process is performed in order to implement the smaller pores and increase the strength (S70). Once the secondary calendering process is completed, a filter medium for a liquid filter that forms the nanofiber web that is combined with the nonwoven fabric, is completed (S80).

Then, even in this embodiment of the present invention, a process of laminating a nanofiber web under a supporter where the nanofiber web has not been formed, may be further executed.

Upon completion of the filter medium, a composite filter medium 10 is formed in the same way as those of the steps S8 and S9 in FIG. 2. Thereafter, a unit cartridge filter for processing liquid is completed through bending, sealing and casing assembly processes (S80 and S90).

By doing so, the filter medium for a liquid filter is manufactured by laminating membranes of a thin multi-layer structure having a fine pore size by the high temperature and high pressure primary and secondary calendering processes, to thereby perform depth filtration as well as surface filtration to thus maximize filter efficiency Hereinafter, the present invention will be described in more detail through the preferred embodiments thereof. However, the following embodiments are nothing but illustrative examples of the present invention, but the scope of the present invention is not limited thereto.

Example 1

PAN 12 wt %–DMAc

In order to manufacture a liquid filter containing a nanofiber medium by air-electrospinning (AES), polyacrylonitrile of about 12 g was added to a solution of dimethylacetamide (DMAc) of about 88 g, and stirred at about 80° C., to thus have prepared a spinning solution.

The prepared spinning solution was injected into a tank, and was discharged as the polymer solution at about 20 ul/min/hole. Here, while maintaining the spinning temperature at about 28° C., and the spinning humidity at about 60%, a voltage of about 110 KV was applied to a spin nozzle pack by using a high-voltage generator, and simultaneously an air pressure of about 0.4 MPa per spin pack nozzle was applied thereto, to thus have prepared a PAN ultrafine fiber web.

In order to increase the strength of the thus-prepared ultrafine fiber web, the ultrafine fiber web was made to undergo a primary drying process at a running time (RT) of about 5 min/m, in which air of about 30° C. was circulating at a speed of about 30 m/sec, to thereby have controlled the solvent and moisture remaining on the surface of the ultrafine fiber web. The solvent and moisture controlled ultrafine fiber web was moved into calendering equipment and then the moved ultrafine fiber web was calendered by using a heating/pressurizing roll under the conditions of a roll temperature of about 185° C. and a pressure of about 1 kgf/cm$^2$. Thereafter, the medium was wound on a winder.

In order to measure the performance of the thus-obtained filter medium as a liquid filter, an average pore size, a maximum pore, etc., were measured according to the measuring specifications of ASTM E1294, by using a capillary flow porometer (Model CFP-1200AE of PMI) (Porous Materials, Inc.) that measures weight, thickness, and pores of the filter medium. The measurement results were illustrated in Table 2.

Example 2

PVdF 12 wt %–Acetone: DMAc=3:7

In order to manufacture a liquid filter containing a nanofiber medium by air-electrospinning (AES), PVdF (polyvinylidenefluoride) of about 12 g was added to a solution of a mixture of dimethylacetamide (DMAc) of about 61.6 g and acetone of about 26.4 g, and stirred at about 80° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 105 KV was applied to the spin nozzle pack by using the high-voltage generator, and simultaneously an air pressure of about 0.25 MPa per spin pack nozzle was applied thereto, to thus have prepared a PVdF ultrafine fiber web.

In order to increase the strength of the thus-prepared ultrafine fiber web, the ultrafine fiber web was made to undergo the primary drying process at a running time (RT) of about 5 min/m, in which air of about 30° C. was circulating at a speed of about 30 m/sec, to thereby have controlled the solvent and moisture remaining on the surface of the ultrafine fiber web. The solvent and moisture controlled ultrafine fiber web was moved into the calendering equipment and then the moved ultrafine fiber web was calendered by using the heating/pressurizing roll under the conditions of a roll temperature of about 150° C., a servo value of about 10 mm, and a pressure of about 1 kgf/cm$^2$. Thereafter, the medium was wound on a winder.

In order to measure the performance of the thus-obtained medium as a liquid filter, measurement was executed in the same manner as the Example 1. The measurement results were illustrated in Table 2.

Example 3

PVdF 16.5 wt %–Acetone: DMAc=2:8

In order to manufacture a liquid filter containing a nanofiber medium by air-electrospinning (AES), PVdF (polyvinylidenefluoride) of about 15 g was added to a solution of a mixture of dimethylacetamide (DMAc) of about 66.8 g and acetone of about 16.7 g, and stirred at about 80° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 108 KV was applied to the spin nozzle pack by using the high-voltage generator, and simultaneously an air pressure of about 0.25 MPa per spin pack nozzle was applied thereto, to thus have prepared a PVdF ultrafine fiber web.

In order to increase the strength of the thus-prepared ultrafine fiber web, the ultrafine fiber web was made to undergo the primary drying process at a running time (RT) of about 5 min/m, in which air of about 30° C. was circulating at a speed of about 30 m/sec, to thereby have controlled the solvent and moisture remaining on the surface of the ultrafine fiber web. The solvent and moisture controlled ultrafine fiber web was moved into the calendering equipment and then the moved ultrafine fiber web was calendered by using the heating/pressurizing roll under the conditions of a roll temperature of about 155° C., a servo value of about 2 mm, and a pressure of about 1 kgf/cm². Thereafter, the medium was wound on a winder.

In order to measure the performance of the thus-obtained medium as a liquid filter, measurement was executed in the same manner as the Example 1. The measurement results were illustrated in Table 2.

Example 4

PVdF 22 wt %–Acetone: DMAc=2:8

In order to manufacture a liquid filter containing a nanofiber medium by air-electrospinning (AES), PVdF (polyvinylidenefluoride) of about 22 g was added to a solution of a mixture of dimethylacetamide (DMAc) of about 54.6 g and acetone of about 23.4 g, and stirred at about 80° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 108 KV was applied to the spin nozzle pack by using the high-voltage generator, and simultaneously an air pressure of about 0.25 MPa per spin pack nozzle was applied thereto, to thus have prepared a PVdF ultrafine fiber web.

In order to increase the strength of the thus-prepared ultrafine fiber web, the ultrafine fiber web was made to undergo the primary drying process at a running time (RT) of about 5 min/m, in which air of about 30° C. was circulating at a speed of about 30 m/sec, to thereby have controlled the solvent and moisture remaining on the surface of the ultrafine fiber web. The solvent and moisture controlled ultrafine fiber web was moved into the calendering equipment and then the moved ultrafine fiber web was calendered by using the heating/pressurizing roll under the conditions of a roll temperature of about 155° C., a servo value of about 2 mm, and a pressure of about 1 kgf/cm². Thereafter, the medium was wound on a winder.

In order to measure the performance of the thus-obtained medium as a liquid filter, measurement was executed in the same manner as the Example 1. The measurement results were illustrated in Table 2.

TABLE 2

| | Base weight (g/m²) | Average thickness (μm) | Average pore (μm) | Maximum pore (μm) | Maximum pore pressure (psi) |
| --- | --- | --- | --- | --- | --- |
| Example 1 | 3.16 | 6.8 | 0.450 | 0.971 | 6.794 |
| Example 2 | 13.76 | 20.4 | 0.228 | 0.452 | 14.598 |
| Example 3 | 11.80 | 19.0 | 0.425 | 0.725 | 9.100 |
| Example 4 | 15.00 | 23.5 | 0.479 | 0.993 | 6.661 |

As illustrated in Table 2, the average pore size of the medium obtained in the present invention is less than about 0.5 μm, and thus is tiny. Accordingly, efficiency of removing impurity particles is very high, as will be described later. In addition, the maximum pore diameter is less than 1 μm and thus is not big, to thereby form a uniform pore distribution. Accordingly, pollutants may be prevented from being intensively escaped through the large pores.

Example 5

PAN/PVdF 12 wt %–DMAc

In order to manufacture a liquid filter containing a nanofiber medium by air-electrospinning (AES), polyacrylonitrile of about 6 g and PVdF (polyvinylidenefluoride) of about 6 g were added to a solution of dimethylacetamide (DMAc) of about 88 g, and stirred at about 100° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 100 KV was applied to the spin nozzle pack by using the high-voltage generator, and simultaneously an air pressure of about 0.4 MPa per spin pack nozzle was applied thereto, to thus have prepared a PAN/PVdF composite ultrafine fiber web.

In order to increase the strength of the thus-prepared ultrafine fiber web, the ultrafine fiber web was made to undergo the primary drying process at a running time (RT) of about 5 min/m, in which air of about 30° C. was circulating at a speed of about 30 m/sec, to thereby have controlled the solvent and moisture remaining on the surface of the ultrafine fiber web. The solvent and moisture controlled ultrafine fiber web was moved into the calendering equipment and then the moved ultrafine fiber web was calendered by using the heating/pressurizing roll under the conditions of a roll temperature of about 180° C., a servo value of about 20 mm, and a pressure of about 1 kgf/cm². Thereafter, the medium was wound on a winder.

In the above Example 5, when the PAN/PVdF composite ultrafine fiber web was formed, diameter of the nanofiber was varied into about 0.1 μm, about 0.2 μm, and about 0.4 μm. The characteristics of the filter medium according to the diameters of the nanofiber were measured and illustrated in Table 3.

In addition, a nanofiber web was manufactured with a spinning solution of a mixture of PVdF of 12 wt % and DMAc according to diameter of the nanofiber of about 0.2 μm and about 0.4 μm in the same manner as that of Example 5. The characteristics of the filter medium according to the diameters of the nanofiber were measured and illustrated in Table 3.

TABLE 3

| | Base weight (g/m²) | Average thickness (μm) | Pore size (μm) Average pore (μm) | Pore size (μm) Maximum pore (μm) | Maximum pore pressure (psi) | Air permeability (cfm) |
|---|---|---|---|---|---|---|
| PVdF 0.2 μm | 13.76 | 20.4 | 0.228 | 0.452 | 14.598 | 0.370 |
| PVdF 0.4 μm | 8.64 | 13.6 | 0.402 | 0.686 | 9.618 | 0.936 |
| PAN/PVdF 0.1 μm | 21.48 | 44 | 0.188 | 0.341 | 19.375 | 0.127 |
| PAN/PVdF 0.2 μm | 5.92 | 11.4 | 0.213 | 0.384 | 17.201 | 0.363 |
| PAN/PVdF 0.4 μm | 1.68 | 3.0 | 0.431 | 0.926 | 7.127 | 7.190 |

As shown in Table 3, as the diameter of the nanofiber becomes small, the average pore and the maximum pore decrease in the present invention. In addition, as the diameter of the nanofiber becomes small, density of the nanofiber increases, and thus the base weight and the average thickness also increase. In addition, the air permeability is reduced, but the more microscopic pollutants may be filtered, to thus raise a filtering effect.

Meanwhile, in order to see the water flow resistance and the filtering performance of the liquid filter containing the nanofiber medium of the present invention, the medium of the present invention was bent to thus have manufactured a cartridge filter. Differential pressure and particle removal efficiency before and after having performed filtering according to the characteristic estimation standards (ASTM F795, RS K 0004) were measured and the measurement results are illustrated in Tables 4 and 5, respectively.

TABLE 4

Differential pressure before and after filtering according to a flow rate of liquid

| Flow rate (lpm) | Differential pressure (psi) | | | |
|---|---|---|---|---|
| | Example 1 | Example 2 | Example 3 | Example 4 |
| 10 | 0.03 | 0.6 | 0.3 | 0.4 |
| 20 | 0.07 | 1.4 | 0.8 | 0.9 |
| 30 | 0.12 | 2.0 | 1.2 | 1.5 |
| 40 | 0.17 | 3.1 | 1.8 | 2.3 |
| 50 | 0.23 | 4.4 | 2.3 | 2.9 |

Here, the differential pressure means a static pressure difference between the upstream side of the filter and the downstream side thereof at a regulated flow rate. A cartridge filter was fitted into a liquid filtration system standardized according to the estimation standards, and the differential pressure before and after filtration was measured with a differential pressure gauge, while increasing the flow rate to about 10 to about 50 lpm.

According to the present invention, as shown in Table 4, a low pressure of about 1 psi or less was applied to the filter at the flow rate of about 10 lpm, and a sudden increase in the pressure was not found even in the case that the flow rate increased up to about 50 lpm. Based on these findings, the liquid filter containing the nanofiber medium of the present invention has shown low energy consumption and a long life.

TABLE 5

The particle removal efficiency of the filter according to the present invention

| ISO 12103-1 standard dust | Removal efficiency (%) | | | |
|---|---|---|---|---|
| A2 fine | Example 1 | Example 2 | Example 3 | Example 4 |
| 0.6 μm | 99.93 | 99.98 | 99.91 | 99.86 |
| 0.8 μm | 99.95 | 99.98 | 99.94 | 99.93 |
| 1.0 μm | 99.98 | 99.99 | 99.97 | 99.97 |
| 2.0 μm | 100 | 100 | 99.98 | 99.99 |
| 3.0 μm | 100 | 100 | 100 | 99.99 |
| 4.0 μm | 100 | 100 | 100 | 100 |
| 5.0 μm | 100 | 100 | 100 | 100 |
| 6.0 μm | 100 | 100 | 100 | 100 |
| 8.0 μm | 100 | 100 | 100 | 100 |
| 10.0 μm | 100 | 100 | 100 | 100 |

In Table 5, the removal efficiency represents a dust holding capacity (D.H.C.) of particles of a certain size trapped by the filter and is indicated in terms of the percentage (%). According to a test method, a cartridge filter was fitted into the liquid filtration system, and particles to be tested were measured by a particle measurement device by using the standards (ISO 12103-1 standard Dust A2 fine), to have measured the removal efficiency.

As shown in Table 5, the liquid filter containing the nanofiber medium of the present invention removed the particles of about 0.6 μm at the percentage of 99% or high, and removed the particles of about 1.0 μm at the percentage of 99.9% or high, to thus have shown an excellent filtering performance.

In addition, the dust holding capacity (D.H.C.) of the liquid filter containing the nanofiber medium according to Example 3 of the present invention was measured under the following test conditions, and the measurement results were illustrated in Table 6.

Test conditions of the dust holding capacity (D.H.C.)

The test method: RS K 0004; the test of filter dust holding capacity

The condition of the test: Water, 25° C., ISO standard Dust A2 fine 15 lpm, 10-inch cartridge filter The condition of test termination: Pressure drop 25 psi, at 15 lpm

TABLE 6

Dust holding capacity (D.H.C.) of the filter medium of the present invention

| Total input particles (g) | Filter weight before test (g) | Filter weight after test (g) | Termination condition reach time (min) | Dust holding capacity (D.H.C.) (g) |
|---|---|---|---|---|
| 200.1 | 300.5 | 369 | 195 | 68.5 |

By the test result, the termination condition reached in 195 min.

Here, the dust holding capacity (D.H.C.) refers to the value indicated by weight of the amount of the particles removed by the filter cartridge, and expressed in terms of grams (g).

As shown in Table 6, the dust holding capacity (D.H.C.) of one cartridge filter containing the nanofiber medium according to Example 3 of the present invention was about 68.5 g. Thus, considering that the dust holding capacity (D.H.C.) of a cartridge filter manufactured by using microfibers available in the domestic market was about 40 g, it was confirmed that the dust holding capacity (D.H.C.) of the cartridge filter according to the present invention was superior to the dust holding capacity (D.H.C.) of about 60 g, that is known as the cartridge filter of the world's highest level by PALL Inc., in the U.S.A.

Comparative Example 1

PVdF 4 wt %–Acetone: DMAc=3:7

In order to manufacture a liquid filter containing a nanofiber medium by air-electrospinning (AES), PVdF (polyvinylidenefluoride) of about 4 g was added to a mixture of a solution of dimethylacetamide (DMAc) of about 67.2 g and acetone of about 28.8 g, and stirred at about 80° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 105 KV was applied to the spin nozzle pack by using the high-voltage generator, and simultaneously an air pressure of about 0.25 MPa per spin pack nozzle was applied thereto, to thus have prepared a PVdF ultrafine fiber web.

According to Comparative Example 1, it was difficult to produce fibrous formation, spinning is not made but spraying is made, to thus form particles not fibers. Otherwise, even if spinning is made, a lot of beads are formed and a solvent is not well evaporated. As a result, a medium will melt during performing a web calendaring process, to thus cause a pore clogging phenomenon to occur.

Comparative Example 2

PVdF 26 wt %–Acetone: DMAc=3:7

In order to manufacture a liquid filter containing a nanofiber medium by air-electrospinning (AES), PVdF (polyvinylidenefluoride) of about 26 g was added to a mixture of a solution of dimethylacetamide (DMAc) of about 51.8 g and acetone of about 22.2 g, and stirred at about 80° C., to thus have prepared a spinning solution.

The prepared spinning solution was injected into the tank, and was discharged as the polymer solution at about 17.5 ul/min/hole. Here, while maintaining the spinning temperature at about 28° C., and the spinning humidity at about 60%, a voltage of about 105 KV was applied to the spin nozzle pack by using the high-voltage generator, and simultaneously an air pressure of about 0.25 MPa per spin pack nozzle was applied thereto, to thus have prepared a PVdF ultrafine fiber web.

According to Comparative Example 2, viscosity of the solution rises up and thus solidification occurs at the surface of the solution, to thereby cause needle ends to be clogged and the solidified portions to be separated off, to thus make it difficult to perform spinning for a long time, and to thereby increase diameter of the fiber, to thus make it impossible to make fibrous formation of a micrometer or less in size.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a liquid filter that may filter materials to be removed as well as impurities or contaminants that are mixed in liquid.

What is claimed is:

1. A method of manufacturing a filter medium for a liquid filter, comprising the steps of:
    dissolving a polymer material in a solvent to obtain a spinning solution;
    air-electrospinning the spinning solution onto a supporter to form a layer of nanofiber on the support;
    repeating the air-electrospinning to form a nanofiber web formed of multiple layers of nanofiber;
    drying a surface portion of the nanofiber web by blowing air of about 30° C. at a speed of about 30 m/sec onto the surface portion of the nanofiber web, while moving the nanofiber web at a speed of about 30 msec, to adjust remaining solvent and moisture in the surface portion of the nanofiber web, thereby increasing strength of the surface portion of the nanofiber web; and
    heat compressing the surface portion dried-nanofiber web to adjust a porosity of the nanofiber web.

2. The method of manufacturing a filter medium for a liquid filter, according to claim 1, wherein the polymer material is from about 5 to about 22.5 wt % in the spinning solution.

3. The method of manufacturing a filter medium for a liquid filter, according to claim 1, wherein the supporter is any one of a spun bond nonwoven fabric, a thermal bond nonwoven fabric, a melt-blown nonwoven fabric, and a wet laid nonwoven fabric.

4. The method of manufacturing a filter medium for a liquid filter, according to claim 1, wherein the hot-compressed nanofiber web has an average pore size less than about 0.5 μm.

* * * * *